United States Patent
Nozaki et al.

(10) Patent No.: US 12,545,363 B2
(45) Date of Patent: Feb. 10, 2026

(54) BICYCLE COMPONENT

(71) Applicant: Shimano Inc., Osaka (JP)

(72) Inventors: Akihiro Nozaki, Osaka (JP); Tomohiro Takimoto, Osaka (JP); Tomoki Koide, Osaka (JP); Koki Matsumoto, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 18/429,961

(22) Filed: Feb. 1, 2024

(65) Prior Publication Data
US 2025/0249979 A1    Aug. 7, 2025

(51) Int. Cl.
*B62M 9/122*     (2010.01)
*B62J 45/20*     (2020.01)
*B62J 45/414*    (2020.01)
*B62M 9/1242*    (2010.01)
*B62M 25/08*     (2006.01)

(52) U.S. Cl.
CPC .............. *B62M 9/122* (2013.01); *B62J 45/20* (2020.02); *B62J 45/414* (2020.02); *B62M 9/1242* (2013.01); *B62M 25/08* (2013.01)

(58) Field of Classification Search
CPC ...... B62M 25/08; B62M 9/122; B62M 9/132; B62M 6/45; B62M 6/50; B62M 9/128; B62M 9/138; B62M 9/1242; B62J 45/414; B62J 45/20
USPC ..................................................... 474/80, 82
See application file for complete search history.

(56) References Cited

U.S. PATENT DOCUMENTS

| | | | | |
|---|---|---|---|---|
| 7,819,032 | B2 * | 10/2010 | Watari | B62M 25/08 73/865.9 |
| 8,286,982 | B2 * | 10/2012 | Plantet | B62K 25/286 188/282.3 |
| 8,998,756 | B2 * | 4/2015 | Ichida | B62K 23/06 474/81 |
| 9,227,697 | B2 * | 1/2016 | Matsumoto | G01R 31/005 |
| 9,656,672 | B2 * | 5/2017 | Schieffelin | B60W 10/11 |
| 10,358,133 | B2 * | 7/2019 | Schieffelin | F16D 41/24 |
| 10,370,062 | B2 * | 8/2019 | Bortolozzo | G06F 8/65 |
| 10,793,222 | B1 * | 10/2020 | Harris | B62M 9/1244 |
| 11,511,827 | B2 * | 11/2022 | Nomura | B62M 11/04 |
| 11,787,504 | B2 * | 10/2023 | Hamed | B62M 9/122 474/80 |
| 2005/0227798 | A1 * | 10/2005 | Ichida | B62M 25/045 474/81 |
| 2009/0191994 | A1 * | 7/2009 | Takamoto | B62M 9/122 474/70 |
| 2010/0198453 | A1 * | 8/2010 | Dorogusker | G06F 1/1626 340/427 |
| 2011/0095507 | A1 * | 4/2011 | Plantet | B62K 25/08 280/277 |

(Continued)

*Primary Examiner* — Henry Y Liu
(74) *Attorney, Agent, or Firm* — Spencer Fane, LLP

(57) ABSTRACT

A bicycle component is basically provided with a sensor, a controller and a communicator. The sensor is configured to detect an input to the bicycle component from an obstacle. The controller is configured to be electrically connected to the sensor. The controller is configured to obtain information related to an unusual state of the bicycle component based on an output from the sensor. The communicator is electrically connected to the controller. The communicator is configured to send the information to a communication device.

25 Claims, 8 Drawing Sheets

(56) References Cited

U.S. PATENT DOCUMENTS

| | | | |
|---|---|---|---|
| 2012/0130603 A1* | 5/2012 | Simpson | B62M 25/08 701/51 |
| 2014/0032067 A1* | 1/2014 | Miglioranza | F16H 9/04 701/60 |
| 2014/0087901 A1* | 3/2014 | Shipman | B62J 43/30 429/100 |
| 2014/0224039 A1* | 8/2014 | Bjork | G01L 3/24 73/862.191 |
| 2015/0111675 A1* | 4/2015 | Shipman | B62M 25/08 474/82 |
| 2016/0121951 A1* | 5/2016 | Lippman | B62H 5/20 340/427 |
| 2016/0152301 A1* | 6/2016 | Bortoli | B62M 9/132 474/82 |
| 2016/0288877 A1* | 10/2016 | Goates | B62M 9/122 |
| 2016/0339986 A1* | 11/2016 | Jordan | G08C 17/02 |
| 2017/0021897 A1* | 1/2017 | Bortolozzo | B62J 50/22 |
| 2017/0106866 A1* | 4/2017 | Schieffelin | B60W 10/11 |
| 2017/0282919 A1* | 10/2017 | Schieffelin | B60W 30/181 |
| 2018/0178881 A1* | 6/2018 | Miglioranza | B62M 9/122 |
| 2018/0186622 A1* | 7/2018 | Mögelin | B81B 3/0045 |
| 2019/0118751 A1* | 4/2019 | Ghannam | B60R 21/01336 |
| 2020/0017155 A1* | 1/2020 | Hu | G05B 23/0283 |
| 2020/0346714 A1* | 11/2020 | Hahn | B62M 9/122 |
| 2021/0107594 A1* | 4/2021 | Juhas | B62M 9/126 |
| 2021/0163100 A1* | 6/2021 | Jordan | B62M 25/08 |
| 2021/0331550 A1* | 10/2021 | Schoolcraft, Jr. | B62K 25/04 |
| 2022/0089251 A1* | 3/2022 | Nomura | B62M 9/06 |
| 2022/0388602 A1* | 12/2022 | Hahn | B62M 9/132 |
| 2023/0202616 A1* | 6/2023 | Shahana | B62J 45/413 180/206.3 |
| 2023/0202617 A1* | 6/2023 | Hamed | B62J 45/411 180/206.3 |
| 2023/0278666 A1* | 9/2023 | Hamed | B62J 45/00 474/80 |
| 2023/0365225 A1* | 11/2023 | Hamed | H02K 11/21 |

* cited by examiner

BICYCLE COMPONENT

BACKGROUND

Technical Field

The present disclosure generally relates to a bicycle component for a bicycle. More specifically, the present disclosure relates to a bicycle component that provides information related to an unusual state of the bicycle component or an additional bicycle component connected to the bicycle component.

Background Information

Recently, bicycles include various electric bicycle components to make the bicycle easier to operate. For example, electrically powered shift systems have been provided that include electric front derailleurs, electric rear derailleurs and electric shift operating devices. In the event one of these electric bicycle components fails or is not operating properly, a user typically needed to take the bicycle to a bicycle shop for maintenance. As a result, some bicycle manufacturers have developed diagnostic devices that can be connected to an electric bicycle component for determining diagnosing a problem or issue with the electric bicycle component. One example of such a diagnostic device is disclosed in U.S. Pat. No. 9,227,697 assigned to Shimano Inc.

SUMMARY

Generally, the present disclosure is directed to various features of a bicycle component for providing information related to an unusual state of the bicycle component or an additional bicycle component connected to the bicycle component.

In view of the state of the known technology and in accordance with a first aspect of the present disclosure, a bicycle component is provided that basically comprises a sensor, a controller and a communicator. The sensor is configured to detect an input to the bicycle component from an obstacle. The controller is configured to be electrically connected to the sensor. The controller is configured to obtain information related to an unusual state of the bicycle component based on an output from the sensor. The communicator is electrically connected to the controller. The communicator is configured to send the information to a communication device.

With the bicycle component according to the first aspect, a user can receive information related to an unusual state of the bicycle component.

In accordance with a second aspect of the present disclosure, the bicycle component according to the first aspect is configured so that the sensor includes an acceleration sensor configured to detect an acceleration input to the bicycle component.

With the bicycle component according to the second aspect, an obstacle contacting the bicycle component can be reliably detected using an acceleration sensor.

In accordance with a third aspect of the present disclosure, the bicycle component according to the first aspect or the second aspect further comprises a base member, a movable member and a linkage structure. The base member is configured to be mounted to a bicycle. The movable member is configured to move with respect to the base member. The linkage structure connects the base member to the movable member. The sensor is provided to at least one of the base member, the movable member and the linkage structure.

With the bicycle component according to the third aspect, the bicycle component can be used to move the movable member with respect to the base member, and the sensor can be conveniently located based on the structure of the bicycle component.

In accordance with a fourth aspect of the present disclosure, the bicycle component according to the third aspect further comprises an actuator unit configured to be electrically connected to the controller. The actuator unit includes an actuator and a housing accommodating the actuator and the sensor. The housing is provided at the base member.

With the bicycle component according to the fourth aspect, the size and the cost of the bicycle component can be reduced by providing the actuator and the sensor in the housing of the actuator unit.

In accordance with a fifth aspect of the present disclosure, the bicycle component according to any one of the first aspect to the fourth aspect is configured so that the information indicates that the output from the sensor is larger than a threshold.

With the bicycle component according to the fifth aspect, the information to be sent to the communication device can be appropriately filtered.

In accordance with a sixth aspect of the present disclosure, a bicycle component is provided that basically comprises an actuator unit, a controller and a communicator. The controller is configured to obtain information related to an unusual state of an additional bicycle component connected to the bicycle component. The controller is configured to be electrically connected to the actuator unit. The controller is configured to actuate the actuator unit. The communicator is electrically connected to the controller. The communicator is configured to send the information to a communication device.

With the bicycle component according to the sixth aspect, a user receive information related to an unusual state of an additional bicycle component using the communicator of the bicycle component.

In accordance with a seventh aspect of the present disclosure, the bicycle component according to the sixth aspect is configured so that the additional bicycle component is electrically connected to the bicycle component via an electrical cable.

With the bicycle component according to the seventh aspect, the bicycle component and the additional bicycle component can be configured to transmit electric power from the additional bicycle component to the bicycle component. Also, the electrical cable can be used to send wired communications between the additional bicycle component and the bicycle component.

In accordance with an eighth aspect of the present disclosure, the bicycle component according to the sixth aspect or the seventh aspect is configured so that the additional bicycle component includes at least one of an operating device, a hub dynamo, a transmission device, an adjustable seatpost, a suspension, a cycle computer, and an assist drive unit.

With the bicycle component according to the eighth aspect, an appropriate bicycle component can be used as the additional bicycle component to communicate with the bicycle component.

In accordance with a ninth aspect of the present disclosure, the bicycle component according to any one of the sixth aspect to the eighth aspect is configured so that the controller is configured to obtain the information based on receipt of a signal from an additional controller of the additional bicycle component.

With the bicycle component according to the ninth aspect, the bicycle component can receive the unusual state of an additional bicycle component. The processing of the information can be preformed by either the controller or the additional controller.

In accordance with a tenth aspect of the present disclosure, the bicycle component according to any one of the sixth aspect to the ninth aspect is configured so that the information is based on an additional output from an additional sensor, and the additional sensor is configured to detect an additional input to a bicycle from an obstacle.

With the bicycle component according to the tenth aspect, an additional sensor can be provided in a suitable location for reliably detecting an additional input to a bicycle from an obstacle.

In accordance with an eleventh aspect of the present disclosure, the bicycle component according to any one of the sixth aspect to the tenth aspect is configured so that the additional sensor includes an additional acceleration sensor configured to detect an additional acceleration input to the bicycle from an obstacle, and the information is based on an additional output from the additional acceleration sensor.

With the bicycle component according to the eleventh aspect, an obstacle input to the bicycle can be reliably detected using an additional acceleration sensor.

In accordance with a twelfth aspect of the present disclosure, the bicycle component according to the tenth aspect or the eleventh aspect is configured so that the additional sensor is provided at the additional bicycle component, and the additional sensor is configured to detect an additional input to the additional bicycle component from the obstacle.

With the bicycle component according to the twelfth aspect, the additional sensor can be suitable located for reliably detecting an additional input to a bicycle from an obstacle.

In accordance with a thirteenth aspect of the present disclosure, the bicycle component according to any one of the tenth aspect to the twelfth aspect is configured so that the information indicates that the additional output from the additional sensor is larger than a threshold.

With the bicycle component according to the thirteenth aspect, the information related to the additional output from the additional sensor can be appropriately filtered before sending the information to the communication device.

In accordance with a fourteenth aspect of the present disclosure, the bicycle component according to any one of the first aspect to the thirteenth aspect is configured so that the unusual state includes states where a bicycle is in a normal operation and states where the bicycle is in an abnormal operation.

With the bicycle component according to the fourteenth aspect, a user receive information about potential damage to the bicycle component even where the bicycle is in a normal operation.

In accordance with a fifteenth aspect of the present disclosure, the bicycle component according to any one of the first aspect to the fourteenth aspect is configured so that the communication device includes an external device. The external device has a first function other than a second function relating to a bicycle.

With the bicycle component according to the fifteenth aspect, a user can use an existing external device to receive the information relating to the unusual state, and does not need to purchase a special communication device.

In accordance with a sixteenth aspect of the present disclosure, the bicycle component according to any one of the first aspect to the fifteenth aspect is configured so that the communicator is configured to send the information to the communication device each time the controller obtains the information.

With the bicycle component according to the sixteenth aspect, a user can quickly receive the information related to an unusual state that is detected.

In accordance with a seventeenth aspect of the present disclosure, the bicycle component according to any one of the first aspect to the sixteenth aspect further comprises a storage device configured to store the information, the information including first information obtained at a first timing and second information obtained at a second timing, the second timing being different from the first timing.

With the bicycle component according to the seventeenth aspect, the information related to unusual states occurring at different times can be stored in the storage device, and retrieved as needed.

In accordance with an eighteenth aspect of the present disclosure, the bicycle component according to any one of the first aspect to the seventeenth aspect is configured so that the communicator is configured to send the first information and the second information together to the communication device.

With the bicycle component according to the eighteenth aspect, a user can receive both information about a present unusual state and information about past unusual states every time an unusual state occurs.

In accordance with a nineteenth aspect of the present disclosure, the bicycle component according to any one of the first aspect to the eighteenth aspect is configured so that the bicycle component includes at least one of an operating device, a hub dynamo, a transmission device, an adjustable seatpost, a suspension, a cycle computer, and an assist drive unit.

With the bicycle component according to the nineteenth aspect, the communication device can receive information relating to an unusual state for at least one of an operating device, a hub dynamo, a transmission device, an adjustable seatpost, a suspension, a cycle computer, and an assist drive unit.

In accordance with a twentieth aspect of the present disclosure, the bicycle component according to any one of the first aspect to the nineteenth aspect is configured so that the communication device includes a notification device configured to output notification information related to the unusual state.

With the bicycle component according to the twentieth aspect, the user can be easily notified of the information via a notification device of the communication device.

In accordance with a twenty-first aspect of the present disclosure, a bicycle control system comprises the bicycle component according to any one of the first aspect to the twentieth aspect and the communication device.

With the bicycle control system according to the twenty-first aspect, a user can use the communication device to be notified of an unusual state of the bicycle from the bicycle component.

In accordance with a twenty-second aspect of the present disclosure, a non-transitory computer-readable storage medium is provided for storing a program thereon. The program is executable by a communication device including a notification device. The program having instructions configured to: cause the communication device to receive information related to an unusual state of an additional bicycle component from a communicator of a bicycle component, and cause the notification device to output notification information related to the unusual state. The information is obtained by a controller of the bicycle component. The controller is configured to actuate an actuator unit of the bicycle component. The additional bicycle component is configured to be electrically connected to the bicycle component.

With the non-transitory computer-readable storage medium according to the twenty-second aspect, a user of the communication device can be easily notified of an unusual state of an additional bicycle component based on information received from a communicator of a bicycle component.

In accordance with a twenty-third aspect of the present disclosure, a non-transitory computer-readable storage medium is storing a program thereon. The program is executable by a communication device including a notification device. The program having instructions configured to: cause the communication device to receive information related to an unusual state of a bicycle component from a communicator of the bicycle component, and cause the notification device to output notification information related to the unusual state. The information is obtained by the controller, which is based on an output from a sensor of the bicycle component. The sensor is configured to detect an input to the bicycle component from an obstacle.

With the non-transitory computer-readable storage medium according to the twenty-third aspect, a user of the communication device can be easily notified of an unusual state of a bicycle component.

Also, other objects, features, aspects and advantages of the disclosed bicycle component will become apparent to those skilled in the art from the following detailed description, which, taken in conjunction with the annexed drawings, discloses preferred embodiments of the bicycle component.

BRIEF DESCRIPTION OF THE DRAWINGS

Referring now to the attached drawings which form a part of this original disclosure, selected embodiments are illustrated.

DETAILED DESCRIPTION

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
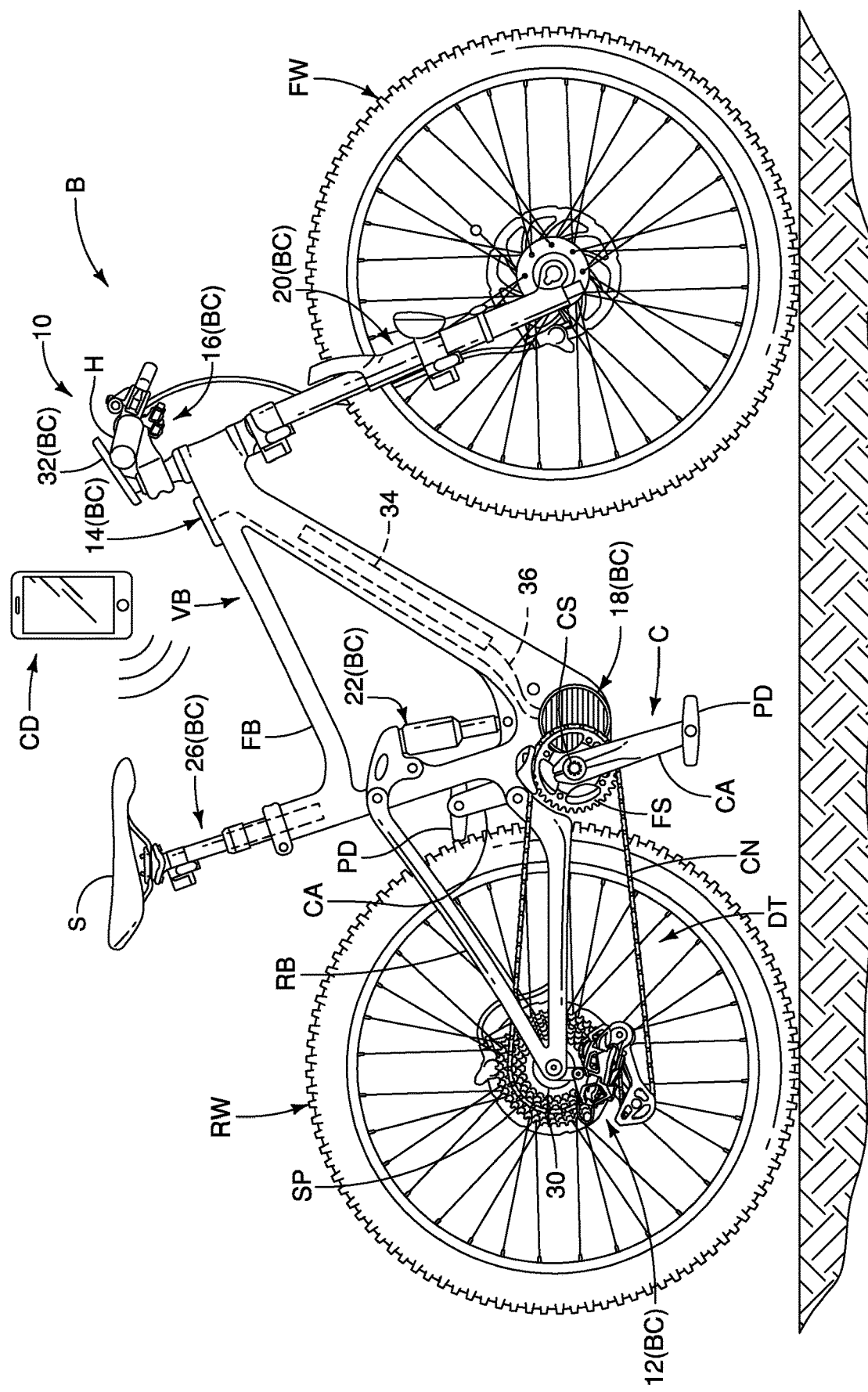
FIG. 1 is a side elevational view of a bicycle that is equipped with a plurality of bicycle components (e.g., a rear derailleur, a front suspension, a rear suspension, an adjustable seatpost, a hub dynamo, a drive unit, etc.) in accordance with illustrated embodiments of the present disclosure.

Referring initially to FIG. 1, a bicycle B is illustrated having a bicycle control system 10 in accordance with illustrated embodiments. Here, the bicycle B is illustrated as an e-bike that uses a driving force of an electric motor in addition to a human driving force for propulsion. However, the bicycle control system 10 can be applied to any other type of bicycles such as, for example, a mountain bike, a cyclocross bicycle, a gravel bike, a city bike, a cargo bike, and a recumbent bike. Moreover, it will be apparent from this disclosure that the bicycle B can have different bicycle components than those illustrated in FIG. 1.

Figure 2:
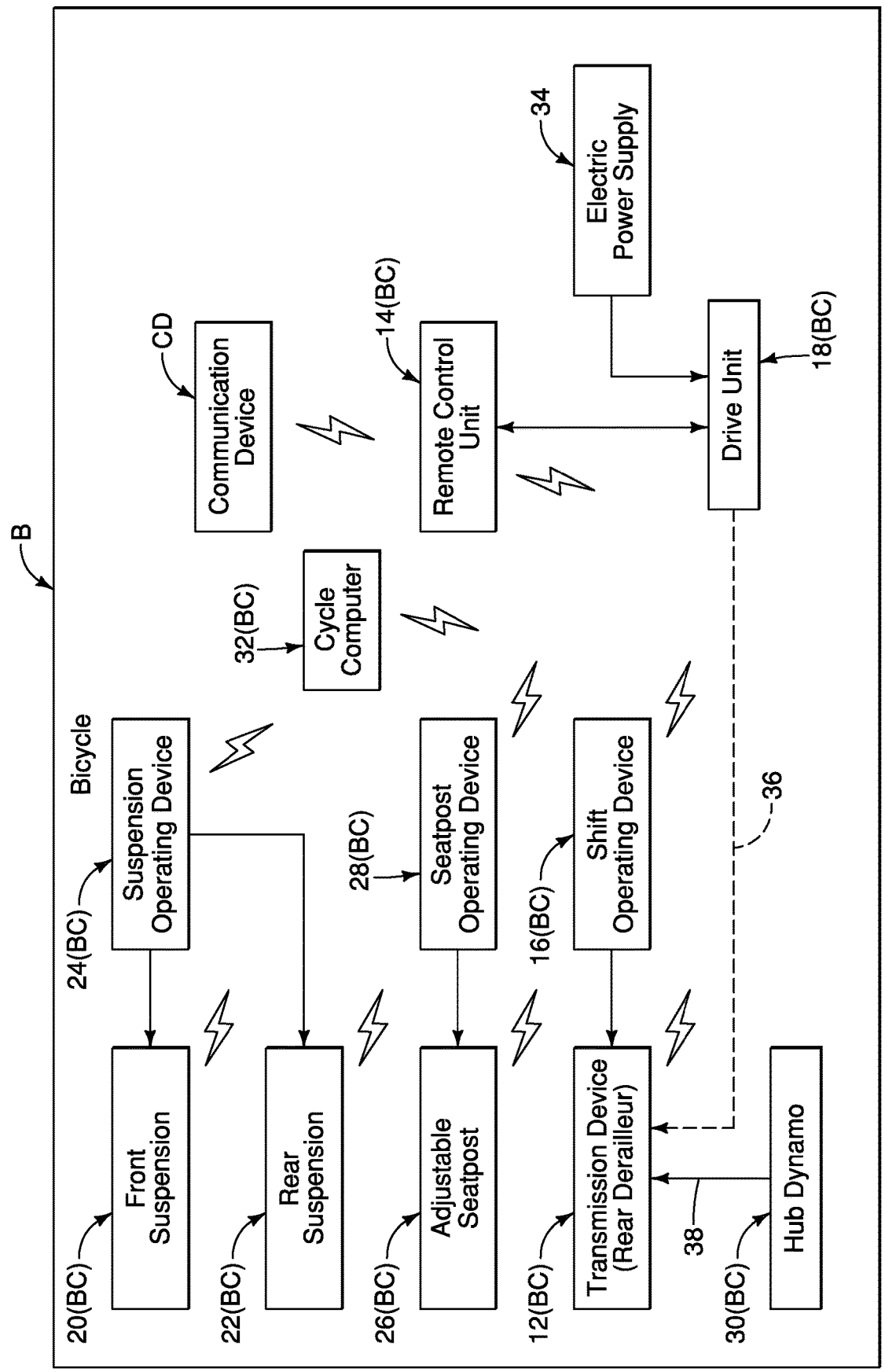
FIG. 2 is a schematic block diagram of a bicycle control system including the bicycle components (e.g., a rear derailleur, a front suspension, a rear suspension, an adjustable seatpost, a rear hub, a drive unit, etc.) of the bicycle illustrated in FIG. 1.

Referring to FIGS. 1 and 2, for example, the bicycle control system 10 can include one or more of the following bicycle components BC: a transmission device 12, a remote control unit 14, a shift operating device 16, a drive unit 18, a front suspension 20, a rear suspension 22, a suspension operating device 24, an adjustable seatpost 26, a seatpost operating device 28, a hub dynamo 30 and a cycle computer 32. Of course, it will be apparent from this disclosure that some of the bicycle components BC can be omitted from the bicycle control system 10 and other bicycle components can be included the bicycle control system 10 as needed and/or desired. In the illustrated embodiment, for example, the transmission device 12 is a rear derailleur. However, the transmission device 12 can include a front derailleur or an internally geared hub. Also, for example, the shift operating device 16, the suspension operating device 24 and the seatpost operating device 28 can be replaced with a single operating device that is configured to perform all of their functions as needed and/or desired. Moreover, the suspension operating device 24 can be replaced with a front suspension operating device and a rear suspension operating device as needed and/or desired.

As seen in FIG. 1, the bicycle B further includes an electric power supply 34. Here, the electric power supply 34 is a battery pack that includes one or more batteries. Here, for example, the electric power supply 34 is located in the down tube of the bicycle frame. Alternatively, the electric power supply 34 can be attached an outer surface of the bicycle frame, or provided in the adjustable seatpost 26 of a seat tube of the bicycle frame. The electric power supply 34 preferably includes one or more rechargeable batteries. The electric power supply 34 is configured to supply electric power to the drive unit 18. For example, as seen in FIG. 1, the drive unit 18 is electrically connected to the electric power supply 34 by an electric cable 36. Optionally, the electric power supply 34 can be configured to supply electric power to the rear derailleur 12. For example, as indicated by the dashed line in FIG. 2, the rear derailleur 12 can be electrically connected to an electrical junction of the drive unit 18 such that the rear derailleur 12 receives electric power from the electric power supply 34 via the drive unit 18. Alternatively, the rear derailleur 12 can be directly connected to the electric power supply 34 to receive the electric power directly from the electric power supply 34.

Here, each of the bicycle components 12, 14, 16, 18, 20, 22, 24, 26, 28, 30 and 32 are electric bicycle components that includes a controller for controlling the bicycle component and a communicator for communicating signals with at least one other bicycle component. The terms "controller" and "electronic controller" as used herein refer to hardware that executes a software program, and does not include a human being. The term "communicator" as used herein refers to hardware that transmits signals, and does not include a human being. The term "communicator" includes a receiver, a transmitter, a transceiver, a transmitter-receiver, and contemplates any device or devices, separate or combined, capable of transmitting and/or receiving communication signals, including shift signals or control, command or other signals related to some function of the component being controlled.

Figure 3:
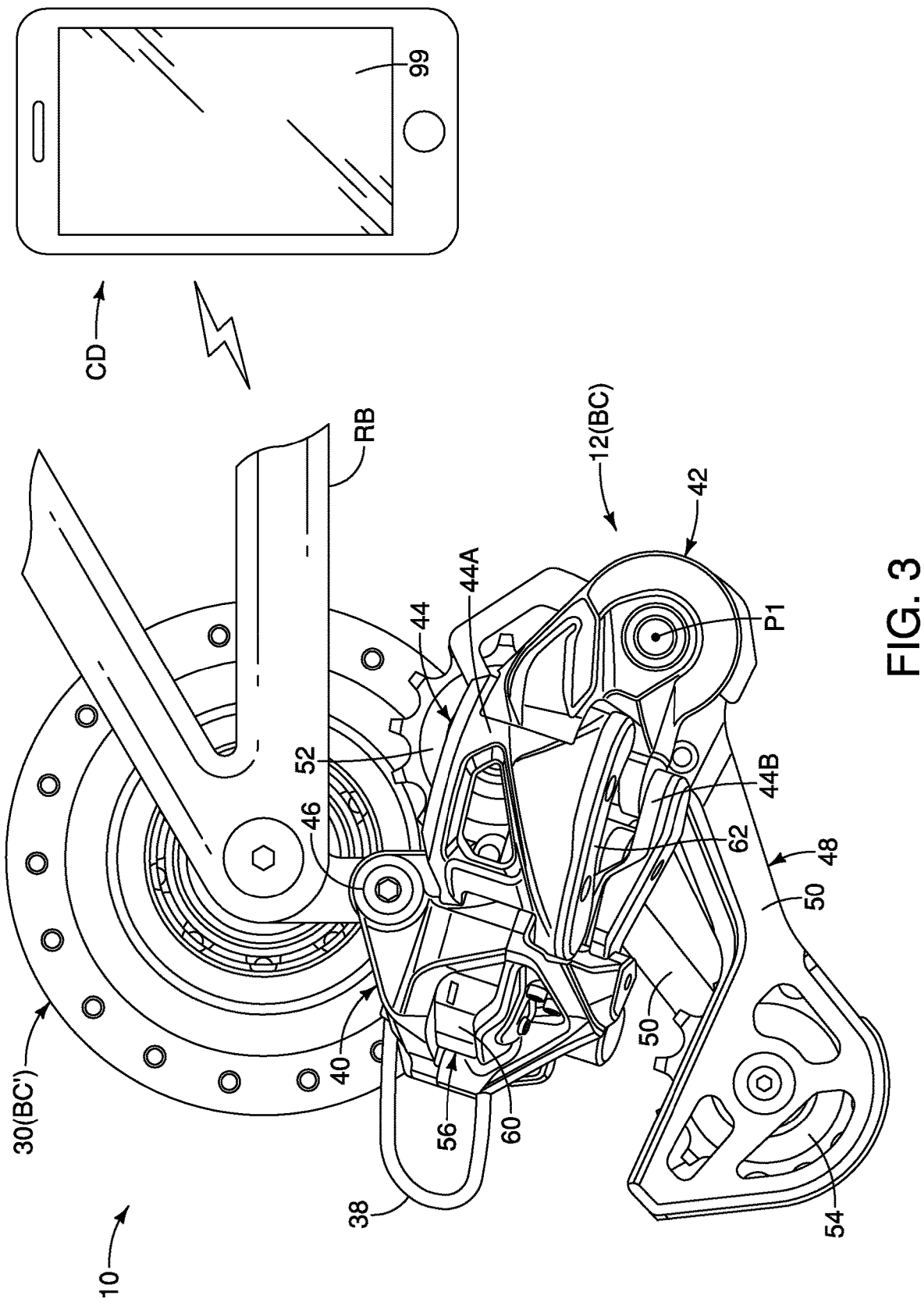
FIG. 3 is a side elevational view of a rear portion of the bicycle frame having the rear derailleur (i.e., a bicycle component) and the hub dynamo (i.e., an additional bicycle component) of the bicycle illustrated in FIG. 1.
Figure 4:
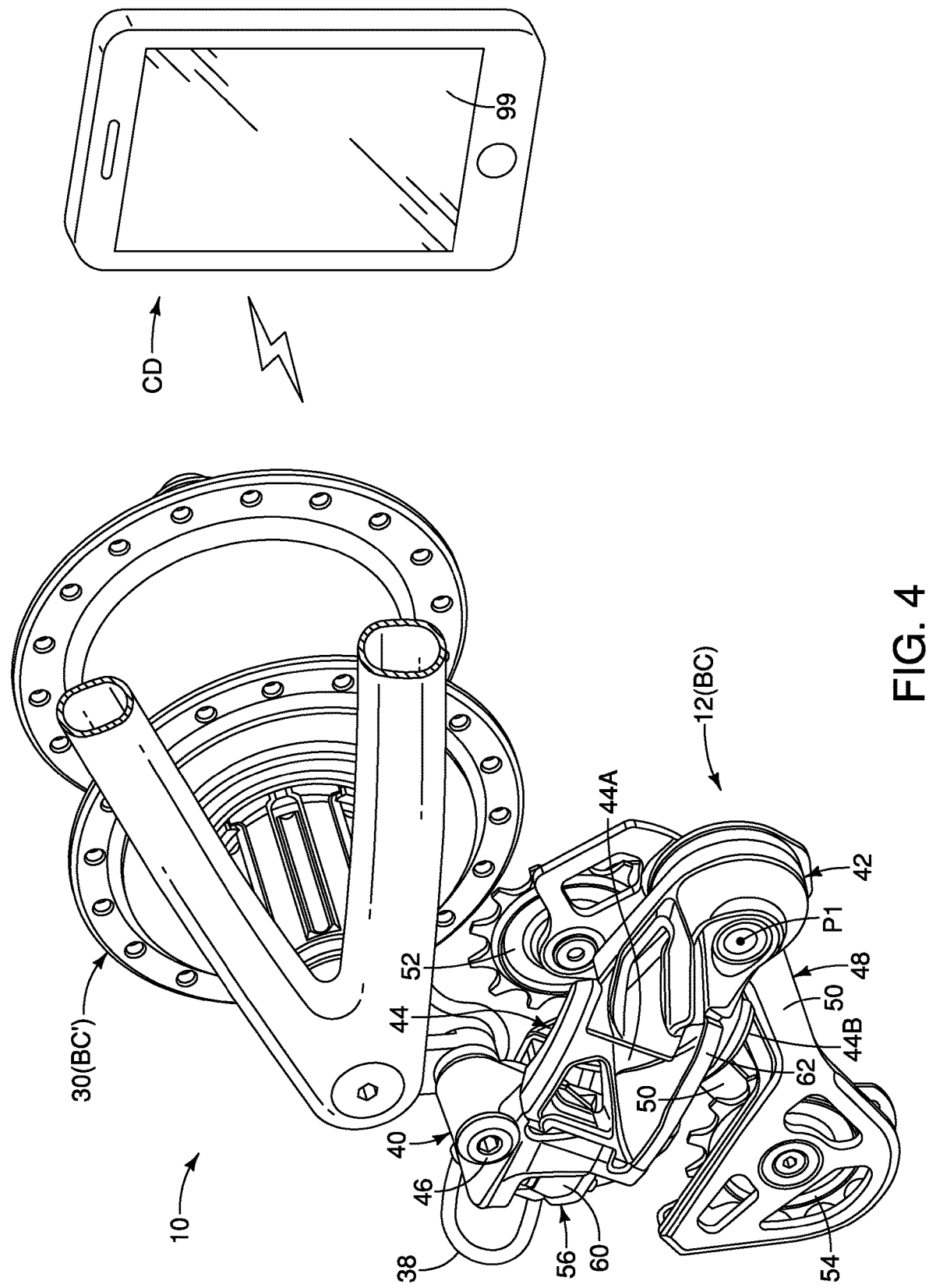
FIG. 4 is a perspective view of the rear portion of the bicycle frame having the rear derailleur (i.e., a bicycle component) and the hub dynamo (i.e., an additional bicycle component) illustrated in FIG. 4.
Figure 7:
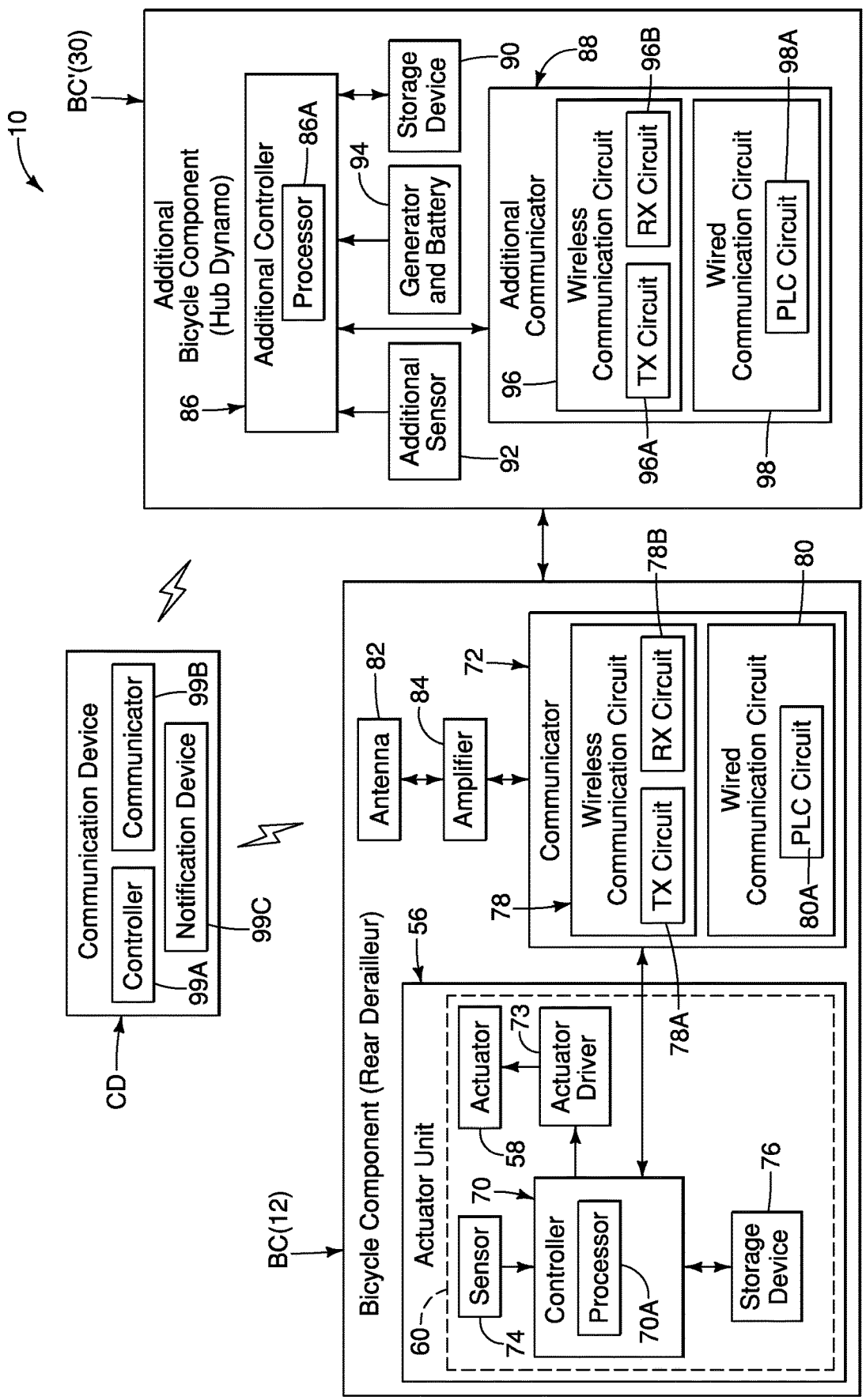
FIG. 7 is a schematic block diagram of a bicycle control system including the communication device, the rear derailleur (i.e., a bicycle component) and the hub dynamo (i.e., an additional bicycle component) of the bicycle illustrated in FIG. 1.

Referring to FIGS. 3, 4 and 7, one example of the bicycle control system 10 will be described in which the bicycle control system 10 comprises a bicycle component BC and a communication device CD. In the illustrated embodiment, the bicycle control system 10 includes the rear derailleur 12 (a transmission device) as the bicycle component BC. Also, in the bicycle component BC includes a smartphone as the communication device CD. However, the bicycle control system 10 is not limited to the illustrated embodiment. In particular, in the bicycle control system 10, the bicycle component BC includes at least one of an operating device (e.g., the shift operating device 16, the suspension operating device 24 and/or the seatpost operating device 28), a hub dynamo (e.g., the hub dynamo 30), a transmission device (e.g., the rear derailleur 12), an adjustable seatpost (e.g., the adjustable seatpost 26), a suspension (e.g., the front suspension 20 and/or the rear suspension 22), a cycle computer (e.g., the cycle computer 32), and an assist drive unit (e.g., the drive unit 18). Typically, the drive unit 18 and the hub dynamo 30 are not provided together on the bicycle B. For example, the hub dynamo 30 can be omitted in a case where the drive unit 18 is provided and the rear derailleur 12 receives electric power from the electric power supply 34 the drive unit 18. Alternatively, the drive unit 18 be omitted in a case where the hub dynamo 30 provides electric power to the rear derailleur 12.

Moreover, the communication device CD is not limited to a smartphone (i.e., an external device) of the illustrated embodiment. The communication device CD can include at least one of a tablet, a laptop computer, a wristwatch-type portable information terminal, a personal computer, and any other portable electronic device having communication functions. Moreover, the communication device CD can include bicycle components that include a communicator such as a cycle computer or a control unit that is mounted to the bicycle B.

Further, as seen in FIGS. 3, 4 and 7, the illustrated embodiment of the bicycle control system 10 will be described in which the bicycle control system 10 includes the hub dynamo 30 as an additional bicycle component BC'. Here, the additional bicycle component BC' (30) is electrically connected to the bicycle component BC (12) via an electrical cable 38. Since the additional bicycle component BC' (30) is a hub dynamo, additional bicycle component BC' (30) is configured to generate electric power that is supplied to the rear derailleur 12. However, the additional bicycle component BC' is not limited to the hub dynamo 30 of the illustrated embodiment. In particular, in the bicycle control system 10, the additional bicycle component BC' includes at least one of an operating device (e.g., the shift operating device 16, the suspension operating device 24 and/or the seatpost operating device 28), a hub dynamo (e.g., the hub dynamo 30), a transmission device (e.g., the rear derailleur 12), an adjustable seatpost (e.g., the adjustable seatpost 26), a suspension (e.g., the front suspension 20 and/or the rear suspension 22), a cycle computer (e.g., the cycle computer 32), and an assist drive unit (e.g., the drive unit 18).

Referring to FIGS. 3 to 6, the basic mechanical structure of the bicycle component BC (the rear derailleur 12) of the bicycle control system 10 will be described for understanding the illustrated embodiment. Although the bicycle component BC is a rear derailleur (i.e., a transmission device), the bicycle component BC can be a different type of bicycle component as needed and/or desired. Here, as seen in FIGS. 3 and 4, the bicycle component BC (12) comprises a base member 40, a movable member 42 and a linkage structure 44. The base member 40 is configured to be mounted to the bicycle B. For example, here, the base member 40 is detachably mounted to the rear frame body RB in a conventional manner such as a fixing bolt 46. The movable member 42 is configured to move with respect to the base member 40. The linkage structure 44 connects the base member 40 to the movable member 42. In particular, the linkage structure 44 is configured to movably connect the movable member 42 relative to the base member 40. Here, in the illustrated embodiment, the linkage structure 44 includes an outer link 44A and an inner link 44B. A first end of the outer link 44A is pivotally coupled to the base member 40. Similarly, a first end of the inner link 44B is pivotally coupled to the base member 40. A second end of the outer link 44A is pivotally coupled to the movable member 42. Similarly, a second end of the inner link 44B is pivotally coupled to the movable member 42. In this way, the base member 40, the movable member 42, the outer link 44A and the inner link 44B form a four-bar linkage.

Here, in the case where the bicycle component BC is a derailleur, the bicycle component BC (12) further comprises a chain guide 48. The chain guide 48 is configured to pivotally coupled to the movable member 42 about a pivot axis P1. The chain guide 48 is configured to move the chain CN (FIG. 1) between a plurality of sprockets SP (FIG. 1) of a sprocket assembly for changing the shift (gear) stage. The chain guide 48 is configured to contact the chain CN to shift the chain CN between the rear sprockets SP as the movable member 42 moves in the lateral direction of the bicycle B relative to the base member 40. Preferably, the chain guide 48 basically includes a pair of chain cage plates 50, a guide pulley 52 and a tension pulley 54. The guide pulley 52 and the tension pulley 54 are both rotatably disposed between the chain cage plates 50. Since rear derailleurs are well known in the bicycle field, conventional structures of the bicycle component BC (12) will only be discussed to the extent needed to understand the bicycle control system 10.

Figure 5:
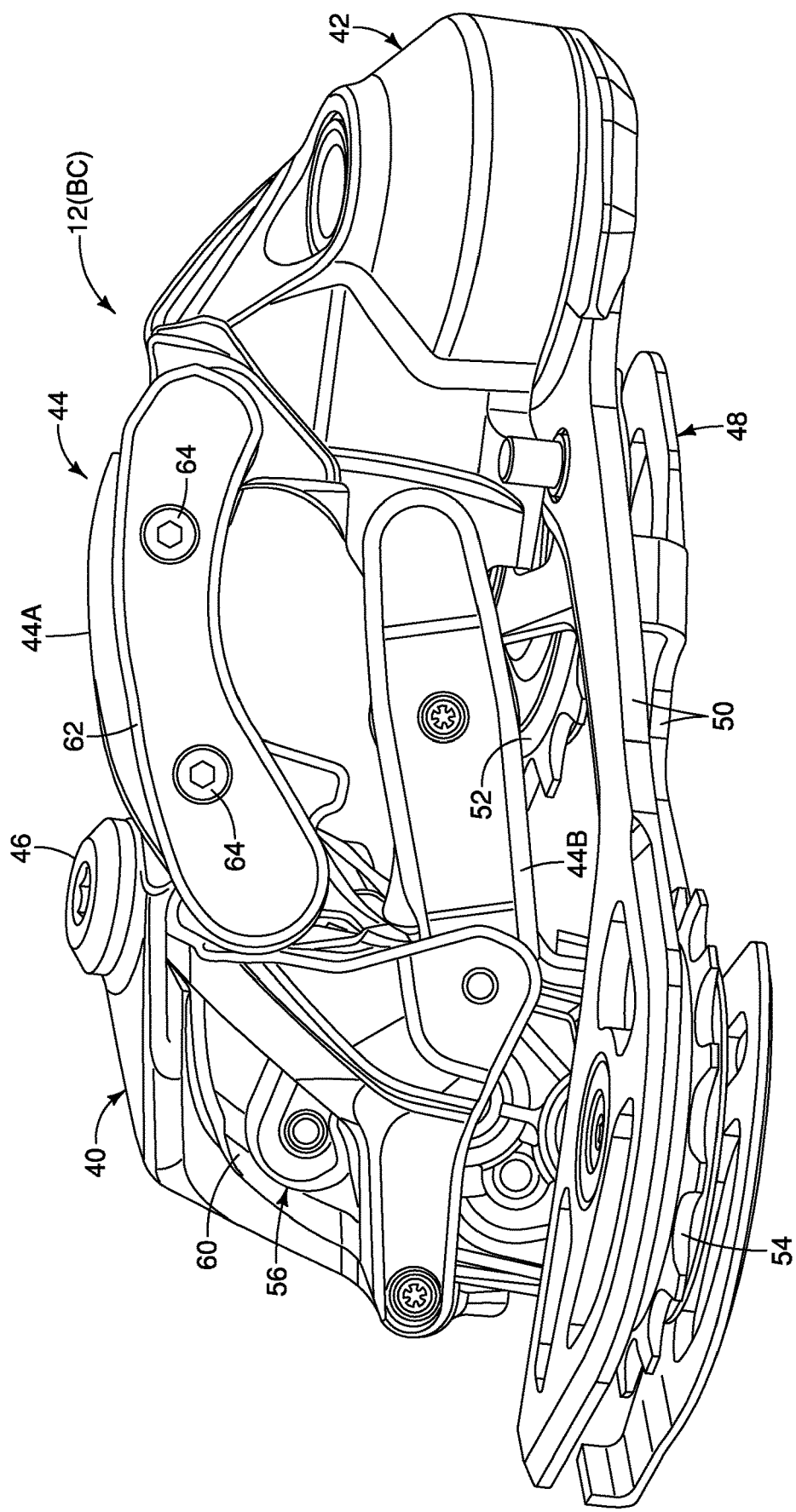
FIG. 5 is a bottom isometric view of the rear derailleur (i.e., a bicycle component) illustrated in FIGS. 3 and 4.

As seen in FIGS. 3 to 5, the bicycle component BC (12) further comprises an actuator unit 56. The actuator unit 56 is configured to move the movable member 42 with respect to the base member 40 in response to a shift command as explained below. The actuator unit 56 is provided to one of the base member 40, the movable member 42 and the linkage structure 44. In the illustrated embodiment, the actuator unit 56 is provided to the base member 40. However, the actuator unit 56 can be provided to either the movable member 42 or the linkage structure 46 as needed and/or desired.

As seen in FIG. 7, the actuator unit 56 includes an actuator 58. The actuator 58 is operatively coupled to the linkage structure 44. In particular, the actuator 58 is operatively coupled to the linkage structure 44 to move the movable member 42 with respect to the base member 40 in response to a shift command. Here, when the bicycle component BC (12) is installed on the bicycle B, the actuator 58 is controlled in response to either a user input to the shift operating device 16 when in manual shifting mode or a shift signal produced by the remote control unit 14 when in automatic shifting mode. In the illustrated embodiment, the actuator 58 is an electric motor. Preferably, the actuator 58 is a reversible electric motor. Thus, in the illustrated embodiment, the bicycle component BC (12A) constitutes an electric rear derailleur. As seen in FIGS. 3 to 7, the actuator unit 56 includes a housing 60. The housing 60 accommodates the actuator 58. Here, the housing 60 is provided at the base member 40. Alternatively, the housing 60 can be provided to either the movable member 42 or the linkage structure 44 as needed and/or desired.

Figure 6:
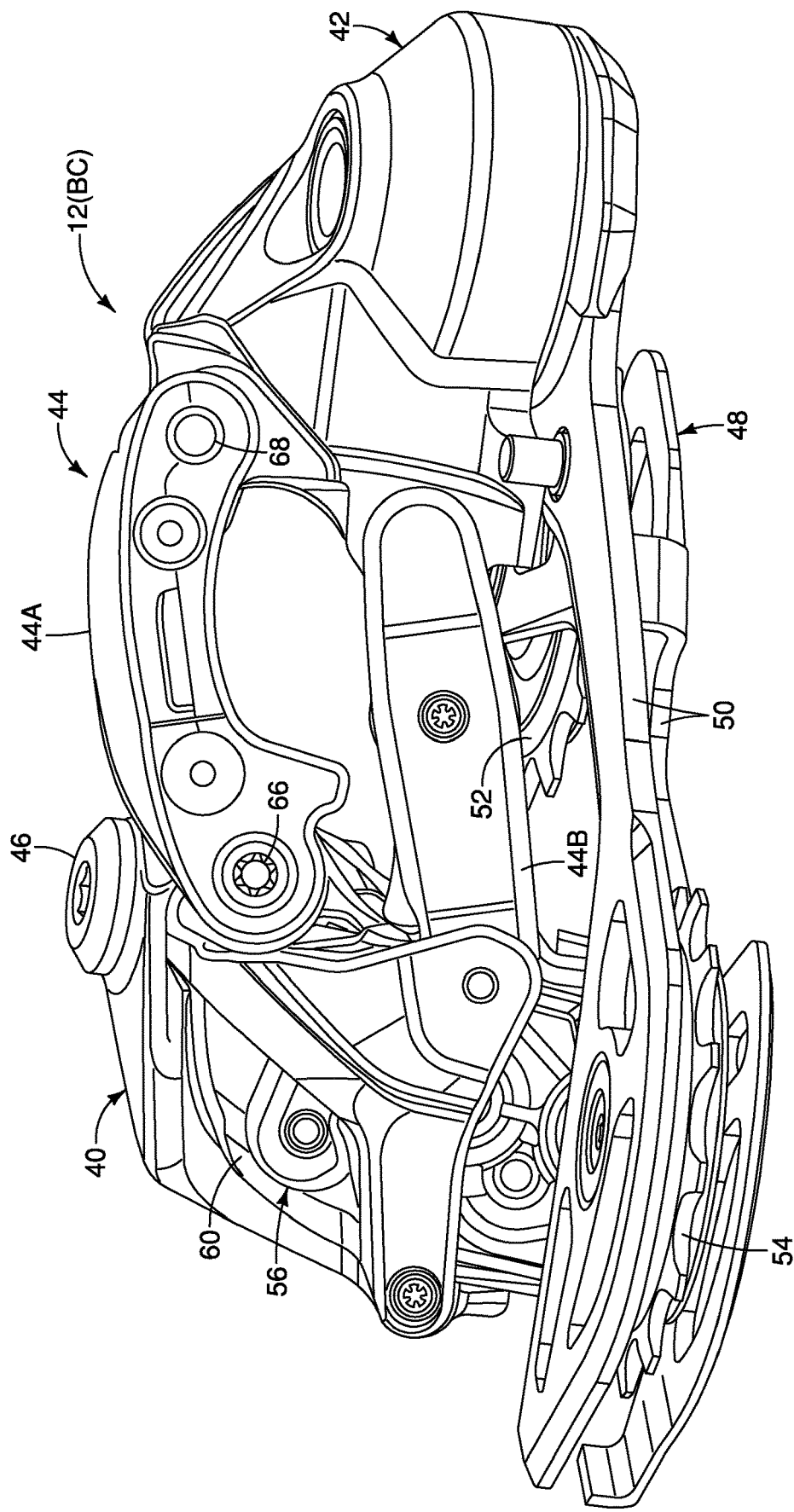
FIG. 6 is a bottom isometric view of the rear derailleur (i.e., a bicycle component) illustrated in FIG. 5, but in which a reinforcement of an outer link of the rear derailleur has been removed.

Referring to FIGS. 3, 5 and 6, the bicycle component BC (the rear derailleur 12) further comprises a reinforced member 62. The reinforced member 62 is coupled to a bottom surface of the outer link 44A. Preferably, the reinforced member 62 is detachably coupled to the bottom surface of the outer link 44A by a pair of screws 64. The reinforced member 62 is configured to overlie a bottom end of a pivot pin 66 connecting the outer link 44A to the base member 40. The reinforced member 62 is also configured to overlie a bottom end of a pivot pin 68 connecting the outer link 44A to the movable member 42.

Referring now to FIG. 7, a schematic block diagram of the electrical configuration of the bicycle control system 10 of the illustrated embodiment will now be described in which the bicycle control system 10 includes in which the bicycle control system 10 comprises a bicycle component BC, an additional bicycle component BC' and a communication device CD. In the illustrated embodiment of FIG. 7, the bicycle control system 10 includes the rear derailleur 12 (a transmission device) as the bicycle component BC, the hub dynamo 30 as the additional bicycle component BC', and a smartphone as the communication device CD. However, as mentioned above, the bicycle control system 10 is not limited to the illustrated embodiment. In other words, the follow description of the electrical configuration of the bicycle control system 10 can be applied to other combinations of bicycle components as needed and/or desired.

As seen in FIG. 7, the bicycle component BC (12) comprises a controller 70 and a communicator 72. The controller 70 is configured to send command signals, data signals or other information to the communicator 72, and is configured to receive data signals or other information from the communicator 72. Preferably, the controller 70 and the communicator 72 are provided on a circuit board. In this way, the communicator 72 is electrically connected to the controller 70. Thus, the controller 70 is configured to control and/or communicate with the actuator 58 and the communicator 72. Preferably, the controller 70 and the communicator 72 are provided in the housing 60 of the actuator unit 56 together with the actuator 58.

The controller 70 is configured to be electrically connected to the actuator unit 56. Preferably, the controller 70 is electrically connected to the actuator 58. In this way, the actuator unit 56 is configured to be electrically connected to the controller 70. The controller 70 is configured to actuate the actuator unit 56. An actuator (motor) driver 73 is provided for driving the actuator 58. The actuator driver 73 is electrically connected to the controller 70. Here, the actuator driver 73 is a drive circuit that is provided on the circuit board, and that actuator driver 73 includes an inverter circuit. The actuator driver 73 drives the actuator 58 in accordance with a control signal from the controller 70. Preferably, the controller 70 and the actuator driver 73 are provided in the housing 60 of the actuator unit 56. While the controller 70 and the actuator driver 73 are preferably provided on the same circuit board as in the illustrated embodiment, the controller 70 and the actuator driver 73 can be provided on separate circuit boards as needed and/or desired. Thus, the controller 70 is configured to control and/or communicate with the actuator 58.

Also, the bicycle component BC (12) further comprises a sensor 74. The controller 70 is configured to obtain information related to an unusual state of the bicycle component BC (12) based on an output from the sensor 74. The communicator 72 is configured to send the information to the communication device CD. In this way, a user can be notified of an unusual state of the bicycle component BC (12). An unusual state can happen when an obstacle directly contact the bicycle component BC (12). The unusual state includes states where the bicycle B is in a normal operation and states where the bicycle is in an abnormal operation. Typically, the term "unusual state" refers to any state in which the bicycle component BC is not operating normally. For example, a normal operation state includes expected states such as a low battery state, a weak communication signal, a battery is connected in a usual manner, an electric cable is connected in a usual manner, etc. However, the term "unusual state" also refers states where the bicycle B is in a normal operation, but some abnormal event has occurred such as an obstacle directly contacting the bicycle component BC (12). In other words, for example, in the case where an obstacle directly contacting the bicycle component BC (12), the controller 70 can be configured to determine that the output from the sensor 74 meets a predetermined criteria for establishing an unusual state exists even if the bicycle component BC (12) appears to be otherwise operating normally. Thus, an unusual state can exist even if the input from an obstacle to the bicycle B, including but not limited to an input directly to the bicycle component BC (12), does not result in any abnormal operation of the bicycle B.

As explained later, while the sensor 74 is provide to the bicycle component BC (12) for detecting whether an unusual state exist or not, the sensor 74 is not limited to this location, For example, a sensor for detecting whether an unusual state of the bicycle component BC exist or not can be provided on the additional bicycle component BC' (30). Also, for example, a sensor for detecting whether an unusual state of the bicycle component BC exist or not can be provided on the bicycle at some other location separate from both the bicycle component BC (12) and the additional bicycle component BC' (30).

Basically, the controller 70 is an electronic controller that includes at least one processor 70A that is configured to execute predetermined control program (e.g., an obstacle detection program, a malfunction detection program, a setting program, a shifting program, etc.). In the case of the malfunction detection program, a malfunction of the controller of the bicycle component BC (12) or the additional bicycle component BC' (30) can be based on the performance of the bicycle component BC (12) or the additional bicycle component BC' (30). For example, the shifting performance can become lower when the controller 70 of the bicycle component BC (12) is malfunctioning. The processor 70A includes, for example, a central processing unit (CPU) or a micro processing unit (MPU). When the bicycle component BC (12) is mounted to the bicycle B, the controller 70 is electrically connected to the additional bicycle component BC' (30) for receiving electric power therefrom. Alternatively, the bicycle component BC (12) can be provided with its own power source or can be electrically connected to the electric power source 34.

The controller 70 is configured to control the actuator 58 for moving the chain guide 48 to shift the chain CN between the rear sprockets SP in a conventional manner. The actuator 58 can be controlled by control signals from either the remote control unit 14 or the shift operating device 16. The remote control unit 14 can also be used for adjusting a setting of the bicycle component BC (12) and for manually actuating the actuator 58 to perform a shift operation. On the other hand, the shift operating device 16 can be used for manually actuating the actuator 58 to perform a shift operation.

The bicycle component BC (12) further comprises a storage device 76. Here, for example, the storage device 76 includes, for example, at least one of a read-only memory (ROM), an erasable programmable read only memory (EPROM), an electrically erasable programmable read-only memory (EEPROM), and a flash memory. The storage device 76 stores various control processes or control programs as well as information or data used by the controller 70. Thus, the storage device 76 is electrically connected to the controller 70. In this way, the controller 70 can retrieve data and access programs stored in the storage device 76, and can store data to the storage device 76. The storage device 76 is configured to store various control programs (e.g., a shifting program), operational data, etc. In particular, the controller 70 is configured to obtain information related to an unusual state of the bicycle component BC (12) based on an output from the sensor 74. The controller 70 is configured to store the information related to an unusual state in the storage device 76. In this way, the storage device 76 is configured to store the information.

Here, the communicator 72 comprises a wireless communication circuit 78. The wireless communication circuit 78 can be provided on the same circuit board as the controller 70, or can be provided on a separate circuit board as needed and/or desired. In this way, the controller 70 is electrically connected to the wireless communication circuit 78. Using the wireless communication circuit 78, the bicycle component BC (12) can wirelessly communicate with the additional bicycle component BC' (30) and the communication device CD. Also, using the wireless communication circuit 78, the bicycle component BC (12) can wirelessly communicate with the remote control unit 14 and/or the shift operating device 16. In the illustrated embodiment, the communicator 72 is configured to receive the information related to the unusual state from the controller 70. Then, the communicator 72 is configured to wirelessly send the information related to the unusual state to the communication device CD.

Here, the wireless communication circuit 78 is configured to both receive and transmit wireless communication signals. In particular, the wireless communication circuit 78 includes a signal transmitting circuit 78A (TX circuit) and a signal receiving circuit 78B (RX circuit). The signal transmitting circuit 78A can also be referred to as a wireless transmitter. The signal receiving circuit 78B can also be referred to as a wireless receiver. The wireless communication signals can be radio frequency (RF) signals, ultra-wide band communication signals, radio frequency identification (RFID), ANT+communications, or Bluetooth® communications, BLE communications an original wireless communication standard, or any other type of signal suitable for short range wireless communications as understood in the bicycle field.

Moreover, optionally, the bicycle component BC (12) further comprises a wired communication circuit 80. The wired communication circuit 80 can be provided on the same circuit board as the controller 70, or can be provided on a separate circuit board as needed and/or desired. In this way, the controller 70 is electrically connected to the wired communication circuit 80. Alternatively, the wired communication circuit 80 can be omitted if needed and/or desired. Using the wired communication circuit 80, the bicycle component BC (12) can communication via the electrical cable 38 with the additional bicycle component BC' (30) using power line communication (PLC). Thus, the controller 70 is configured to receive data signals from the communicator 72 and output data signals to the communicator 72.

Here, the wired communication circuit 80 is configured to both receive and transmit communication signals. In particular, the wired communication circuit 80 includes a power line communication circuit 80A that is configured to perform two-way wired communications via the electrical cable 38. Alternatively, the wired communication circuit 80 can be omitted if needed and/or desired.

The bicycle component BC (12) further comprises an antenna 82 coupled to the communicator 72. The antenna 82 is configured to receive and transmit wireless signals from the communicator 72. Here, the bicycle component BC (12) further comprises a signal amplifier 84 coupled to the communicator 72. The signal amplifier 84 is provided for selectively amplifying the signals of the antenna 82. The signal amplifier 84 can be controlled by the controller 70 or a slave controller of the communicator 72.

In the illustrated embodiment, the bicycle component BC (12) is illustrated as having only a single controller (i.e., the controller 70) a single storage device (i.e., the storage device 76). However, the communicator 72 can have its own controller and its own storage device as needed and/or desired. For example, the controller 70 can be a master controller and the controller of the communicator 72 can be a slave controller. Thus, the term "controller" as used herein includes a single controller or multiple controllers at separate locations. Likewise, the term "storage device" as used herein includes a single storage device or multiple storage devices at separate locations.

The controller 70 can be configured to control the communicator 72 to send the information related to an unusual state to the communication device CD in different ways. For example, the communicator 72 is configured to send the information to the communication device CD each time the controller 70 obtains the information. In this way, every time the controller 70 determines an unusual state exists based on the output from the sensor 74, the communicator 72 to sends the information related to a present unusual state to the communication device CD. Preferably, each time an unusual state is detected, the controller 70 stores the information based in the output from the sensor 74 in the storage device 76. In this way, an information log is created of all of the unusual states that have been detected for a predetermined period. The predetermined period can be, for example, a preset time period, a period starting each time electric power is provided to the bicycle component BC, or a period that continues until a user manually resets (clears) the information log.

Instead of merely sending the information related to a present unusual state to the communication device CD each time an unusual state exists, for example, the controller 70 can be configured to control the communicator 72 to send the information related to multiple occurrences of unusual states occurring at different time in a single communication to the communication device CD. In other words, the information includes first information obtained at a first timing and second information obtained at a second timing. The second timing being different from the first timing. Then, the communicator 72 is configured to send the first information and the second information together to the communication device CD. Of course, the information can include additional information (e.g., third information, fourth information, etc.) obtained at different timings (e.g., a third timing, a fourth timing, etc.) that are all sent together in a single communication.

The sensor 74 is configured to detect an input to the bicycle component BC (12) from an obstacle. The terms "sensor" and "detector" as used herein refer to a hardware device or instrument designed to detect the presence or absence of a particular event, object, substance, or a change in its environment, and to emit a signal in response. The terms "sensor" and "detector" as used herein do not include a human being. The controller 70 is configured to be electrically connected to the sensor 74. Thus, the controller 70 is configured to receive an output (i.e., a detection result) from the sensor 74. The controller 70 is configured to obtain information related to an unusual state of the bicycle component BC (12) based on an output from the sensor 74.

The controller 70 is configured to output information as a data signal to the communicator 72 based on the detection result from the sensor 74. Alternatively, in the case where the communicator 72 includes a controller, the sensor 74 can be configured to send the detection result directly to the communicator 72. In any case, the communicator 72 is configured to send the information to the communication device CD. The communicator 72 can wirelessly send the information to the communication device CD using the wireless communication circuit 78. Alternatively, the communicator 72 can wireless send the information to the communication device CD using the wired communication circuit 80.

Preferably, the sensor 74 includes an acceleration sensor that is configured to detect an acceleration input to the bicycle component BC (12). The sensor 74 is provided to at least one of the base member 40, the movable member 42 and the linkage structure 44. The housing 60 accommodates the sensor 74.

The controller 70 is configured to evaluate the information to determine whether or not to send the information the communication device CD. For example, in the case where an obstacle contacts the bicycle component BC (12), the controller 70 compares a detection result from the sensor 74 with a threshold prestored in the storage device 76. The controller 70 is configured to send the information in a case where the information indicates that the output from the sensor 74 is larger than a threshold. In this way, the information to be sent to the communication device CD can be appropriately filtered by the controller 70 before sending the information to the communication device CD.

Now with reference to FIG. 7, the electrical configuration of the additional bicycle component BC' (30) will be discussed. Although the additional bicycle component BC' (30) is a hub dynamo, the additional bicycle component BC' (30) can be a different type of bicycle component as needed and/or desired. Thus, the additional bicycle component BC' is not limited to the hub dynamo 30 of the illustrated embodiment. Since the mechanical structure of a hub dynamo such as the hub dynamo 30 is well know in the bicycle field, the mechanical structure of the hub dynamo 30.

Here, the additional bicycle component BC' (30) comprises an additional controller 86, an additional communicator 88 and a storage device 90. Here, the additional bicycle component BC' (30) further comprises an additional sensor 92. The additional controller 86 is configured to send command signals, data signals or other information to the additional communicator 88, and is configured to receive data signals or other information from the additional communicator 88. Preferably, the additional controller 86 and the additional communicator 88 are provided on a circuit board. In this way, the additional communicator 88 is electrically connected to the additional controller 86. Thus, the additional controller 86 is configured to control and/or communicate with the additional communicator 88. In the case of a hub dynamo, the additional controller 86 and the additional communicator 88 are provided inside a hub shell of the additional bicycle component BC' (30).

Basically, the additional controller 86 is an electronic controller that includes at least one processor 86A that is configured to execute predetermined control program (e.g., an obstacle detection program, a malfunction detection program, a setting program, a generation control program, etc). The processor 86A includes, for example, a central processing unit (CPU) or a micro processing unit (MPU). When the additional bicycle component BC' (30) is mounted to the bicycle B, the additional controller 86 controls the electric power supplied to the bicycle component BC (12) via the electric cable 38.

Here, the additional communicator 88 comprises a wireless communication circuit 96. Optionally, to boost the signal of the wireless communication circuit 96, the additional bicycle component BC' (30) can further include an antenna and a signal amplifier as needed and/or desired. Alternatively, the wireless communication circuit 96 can be omitted if needed and/or desired, and wired communications can be performed between the bicycle component BC (12) and the additional bicycle component BC' (30) via the electrical cable 38, as discussed below. The wireless communication circuit 96 can be provided on the same circuit board as the additional controller 86, or can be provided on a separate circuit board as needed and/or desired. In this way, the additional controller 86 is electrically connected to the wireless communication circuit 96. Using the wireless communication circuit 96, the additional bicycle component BC' (30) can wirelessly communicate with the bicycle component BC (12). In the illustrated embodiment, the additional communicator 88 is configured to receive the information related to the unusual state from the additional controller 86 and send it to the communicator 72 of the bicycle component BC (12).

Here, the wireless communication circuit 96 is configured to both receive and transmit wireless communication signals. In particular, the wireless communication circuit 96 includes a signal transmitting circuit 96A (TX circuit) and a signal receiving circuit 96B (RX circuit). The signal transmitting circuit 96A can also be referred to as a wireless transmitter. The signal receiving circuit 96B can also be referred to as a wireless receiver. The wireless communication signals can be radio frequency (RF) signals, ultra-wide band communication signals, radio frequency identification (RFID), ANT+communications, or Bluetooth® communications, BLE communications an original wireless communication standard, or any other type of signal suitable for short range wireless communications as understood in the bicycle field.

Moreover, optionally, the additional bicycle component BC' (30) further comprises a wired communication circuit 98. The wired communication circuit 98 can be provided on the same circuit board as the additional controller 86, or can be provided on a separate circuit board as needed and/or desired. In this way, the additional controller 86 is electrically connected to the wired communication circuit 98. Alternatively, the wired communication circuit 98 can be omitted if needed and/or desired. Using the wired communication circuit 98, the additional bicycle component BC' (30) can communication via the electrical cable 38 with the bicycle component BC (12) using power line communication (PLC). Thus, the additional controller 86 is configured to receive data signals from the additional communicator 88 and output data signals to the additional communicator 88.

Here, the wired communication circuit 98 is configured to both receive and transmit communication signals. In particular, the wired communication circuit 80 includes a power line communication circuit 98A that is configured to perform two-way wired communications via the electrical cable 38. Alternatively, the wired communication circuit 80 can be omitted if needed and/or desired.

Here, for example, the storage device 90 includes, for example, at least one of a read-only memory (ROM), an erasable programmable read only memory (EPROM), an electrically erasable programmable read-only memory (EEPROM), and a flash memory. The storage device 90 stores various control processes or control programs as well as information or data used by the additional controller 86. Thus, the storage device 90 is electrically connected to the additional controller 86. In this way, the additional controller 86 can retrieve data and access programs stored in the storage device 90, and can store data to the storage device 90. The storage device 90 is configured to store various control programs (e.g., an obstacle detection program, a generator malfunction detection program, a battery malfunction detection program, etc.), operational data, etc. In particular, the additional controller 86 is configured to obtain information related to an unusual state of the additional bicycle component BC' (30) based on an output from the additional sensor 92. The additional controller 86 is configured to store the information related to an unusual state in the storage device 90.

Basically, the additional sensor 92 is provided at the additional bicycle component BC' (30). However, the additional sensor 92 need not be located at the additional bicycle component BC' (30). For example, the additional sensor 92 can be located at position remote from both the additional bicycle component BC' (30) and bicycle component BC (12). In other words, the additional sensor 92 may be a separate member from the bicycle component BC (12) and the additional bicycle component BC' (30). In any case, the additional sensor 92 is configured to detect an additional input to the bicycle B from an obstacle. In the case of the illustrated embodiment, the additional sensor 92 is configured to detect an additional input to the additional bicycle component BC' (30) from an obstacle. Preferably, in the illustrated embodiment, the additional sensor 92 includes an additional acceleration sensor. The additional acceleration sensor 92 is configured to detect an additional acceleration input to the bicycle B from an obstacle. Where the additional sensor 92 is provided to the additional bicycle component BC' (30), the additional acceleration sensor 92 is configured to detect an additional acceleration input to the additional bicycle component BC' (30) from an obstacle. However, the additional sensor is not limited to an acceleration sensor. The additional acceleration sensor 92 can be a sensor that detects other unusual states that can occur in the additional bicycle component BC' (30). In any case, the additional sensor 92 outputs information related to an unusual state. Accordingly, the information is based on an additional output from the additional sensor 92.

In the illustrated embodiment, the additional communicator 88 does not directly communicate with the communication device CD. Rather, in the illustrated embodiment, the additional communicator 88 communicates with the communicator 72 of the bicycle component BC (12). Thus, the information related to an unusual state is outputted from the additional sensor 92 to the additional controller 86. The additional controller 86 then controls the additional communicator 88 to send the information to the communicator 72 of the bicycle component BC (12). As a result, the controller 70 receives the information is based on the additional output from the additional sensor 92 via the additional communicator 88. The information based on the additional output from the additional sensor 92 can be sent either via wired communication or wireless communication. In this way, the controller 70 is configured to obtain the information based on receipt of a signal from the additional controller 86 of the additional bicycle component BC' (30). Accordingly, the controller 70 is configured to obtain information related to an unusual state of the additional bicycle component BC' (30) that is connected to the bicycle component BC (12).

The controller 70 is configured to evaluate the information to determine whether or not to send the information the communication device CD. For example, in the case where an obstacle contacts the additional bicycle component BC' (30), the controller 70 compares a detection result from the additional sensor 92 with a threshold prestored in the storage device 76. The controller 70 is configured to send the information in a case where The information indicates that the additional output from the additional sensor 92 is larger than a threshold. In this way, the information to be sent to the communication device CD can be appropriately filtered by the controller 70 before sending the information to the communication device CD.

In the illustrated embodiment, the bicycle control system 10 includes both the sensor 74 and the additional sensor 92. However, the bicycle control system 10 can be configured to just include the sensor 74 or just include the additional sensor 92, as needed and/or desired. Also, while the sensor 74 and the additional sensor 92 are described as including an acceleration sensor and an additional acceleration sensor, respectively, the bicycle control system 10 is not limited to using acceleration sensors. The bicycle control system 10 can include other types of sensors depending on the bicycle component. For example, the bicycle component BC (12) can be provided with a sensor that detects an unusual state of the communicator 72. Likewise, the additional bicycle component BC' (30) can be provided with a sensor that detects an unusual state of the additional communicator 88.

Since the additional bicycle component BC' (30) is a hub dynamo, the additional bicycle component BC' (30) further comprises an electrical unit 94. The electrical unit 94 includes a generator and a battery. The generator is configured to generate electric power as the rear wheel rotates. The electric power is stored in the battery of the electrical unit 94. The electrical unit 94 is electrically connected to the bicycle component BC (12) by the electric cable 38. In this way, electric power is supplied from the battery of the electrical unit 94 to the electrical parts of the bicycle component BC (12).

Also, in the case where the additional bicycle component BC' (30) is a hub dynamo, the additional sensor 92 can include a sensor that detects an unusual state of the battery and/or a sensor that detects an unusual state of the generator.

In the illustrated embodiment, the communication device CD is configured to wireless communicate with one or more of the bicycle components BC. Here in the illustrated embodiment, as mentioned above, the communication device CD includes an external device. Thus, where the communication device CD includes an external device, the communication device CD has one or more primary functions such as a telephone function, a message function, a web browsing function, etc. In other words, the external device has a first function other than a second function relating to the bicycle B. The first function of the external device (the communication device CD) includes one or more primary functions such as a telephone function, a message function, a web browsing function, etc. The second function of the external device (the communication device CD) includes one or more secondary functions communicating with the bicycle components BC, diagnosing errors in the bicycle components BC, displaying data of the bicycle components BC, etc.

As seen in FIG. 7, the communication device CD includes a controller 99A and a communicator 99B. The controller 99A includes an application (as called an "app") or program for processing the information from the bicycle component BC (12). The communicator 99B is configured to conduct wireless communications with at least the bicycle component BC (12). Since the communication device CD is conventional device in which the details as well known, the communication device CD will not be further described herein.

As seen in FIG. 7, the communication device CD includes a notification device 99C. The notification device 99C is configured to output notification information related to the unusual state. Here, the communication device CD is a smartphone which includes a display as an example of the notification device 99C. The display includes, for example, a liquid crystal display, a segment display, or an organic light emitting diode (OLED) display. Also, in the case of a smartphone, the communication device CD include a speaker as another example of the notification device 99C. The notification information includes a first operation information for prompting a user's operation to be performed by a user to correct, investigate or examined the unusual state of the bicycle component BC (12). For example, the message of the first operation information can be a message for prompting the user to check the operation of the bicycle component BC (12). The notification information further includes second operation information for prompting the user take the bicycle component BC (12) to a dealer the dealer. Depending on the nature of the unusual state of the bicycle component BC (12), either the first operation information or the second operation information can be provided in the notification information for the unusual state of the bicycle component BC (12), or both the first operation information and the second operation information can be provided in the notification information for the unusual state of the bicycle component BC (12).

A non-transitory computer-readable storage medium can be provided to the communication device CD for communicating with the bicycle component BC (12) to receive information related to an unusual state of the bicycle component BC (12) and/or an unusual state of an additional bicycle component BC' (30). The non-transitory computer-readable storage medium is for example a read-only memory (Read-Only Memory, ROM), a random access memory (Random Access Memory, RAM), a magnetic disk, an optical disc, a pluggable USB drive, or the like provided to the communication device CD. The non-transitory computer-readable storage medium stores a program thereon. The program is executable by the communication device CD. In other words, the computer readable storage medium stores therein a computer program. The computer program is used to be executed by a processor of the communication device CD to implement various processes to receive information related to an unusual state of the bicycle component BC (12) and/or an unusual state of an additional bicycle component BC' (30).

In the case where the information sent to the communication device CD is related to an unusual state of the bicycle component BC (12), the program has instructions configured to: cause the communication device CD to receive information related to an unusual state of the bicycle component BC (12) from the communicator 72 of the bicycle component BC (12), and cause the notification device 99C to output notification information related to the unusual state. As mentioned above, in this case, the information is obtained by the controller 70 is based on an output from the sensor 74 of the bicycle component BC (12). The sensor 74 is configured to detect an input to the bicycle component BC (12) from an obstacle. In other words, the unusual state of the bicycle component BC (12) is sent directly from the communicator 72 of the bicycle component BC (12).

In the case where the information sent to the communication device CD is related to an unusual state of the additional bicycle component BC' (30), the program has instructions configured to: cause the communication device CD to receive information related to an unusual state of the additional bicycle component BC' (30) from the communicator 72 of the bicycle component BC (12), and cause the notification device 99C to output notification information related to the unusual state. As mentioned above, in this case, the information is obtained by the controller 70 of the bicycle component BC (12). The controller 70 is configured to actuate the actuator unit 56 of the bicycle component BC (12). The additional bicycle component BC (12) is configured to be electrically connected to the bicycle component BC (12). In other words, the unusual state of the additional bicycle component BC' (30) is sent directly from the communicator 72 of the bicycle component BC (12) and not directly from the additional communicator 88 of the additional bicycle component BC' (30).

Figure 8:
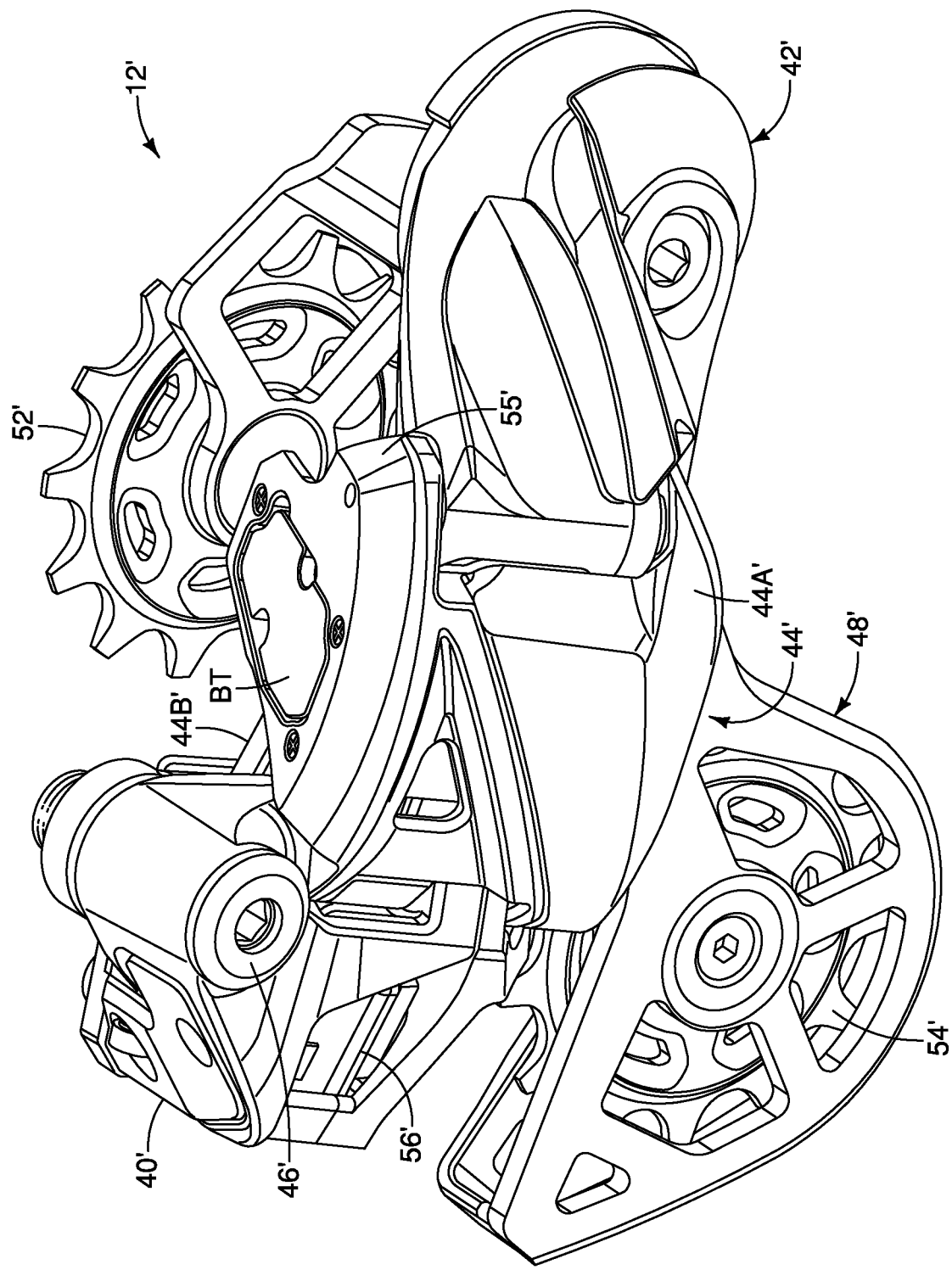
FIG. 8 is a perspective view of a modified rear derailleur (i.e., a bicycle component) which can be used in the bicycle control system of FIG. 7.

Referring now to FIG. 8, a modified rear derailleur 12' (i.e., a bicycle component BC) is illustrated in which the rear derailleur 12' can be used in the bicycle control system 10 of FIG. 7. Basically, the rear derailleur 12' is identical to the rear derailleur 12, except that the rear derailleur 12' has been modified to include its own power source.

The rear derailleur 12' comprises a base member 40', a movable member 42' and a linkage structure 44'. The base member 40' is configured to be mounted to the bicycle B. For example, here, the base member 40' is detachably mounted to the rear frame body RB in a conventional manner such as a fixing bolt 46'. The linkage structure 44' is configured to movably connect the movable member 42' relative to the base member 40' in the same manner as discussed above regarding in the rear derailleur 12. Thus, here, the linkage structure 44' includes an outer link 44A' and an inner link 44B' that form a four-bar linkage with the base member 40' and the movable member 42'.

The rear derailleur 12' further comprises a chain guide 48'. The chain guide 48' is configured to pivotally coupled to the movable member 42'. Preferably, the chain guide 48' basically includes a pair of chain cage plates 50', a guide pulley 52' and a tension pulley 54'. The guide pulley 52' and the tension pulley 54' are both rotatably disposed between the chain cage plates 50'. Since rear derailleurs are well known in the bicycle field, the conventional structures of the rear derailleur 12' have only been briefly discussed herein to the extent needed to understand the bicycle control system 10.

Here, the rear derailleur 12' further comprises a battery holder 55'. The battery holder 55' is configured to support a battery BT. The battery holder 55' is provided to the outer link 44A'. Alternatively, a battery holder can be provided to any one of the base member 40', the movable member 42' or the inner link 44B'. The battery BT is electrically connected to the actuator unit 56' to supply electric power to an actuator of the actuator unit 56'.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle component. Accordingly, these directional terms, as utilized to describe the bicycle component should be interpreted relative to a bicycle in an upright riding position on a horizontal surface and that is equipped with the bicycle component. The terms "left" and "right" are used to indicate the "right" when referencing from the right side as viewed from the rear of the bicycle, and the "left" when referencing from the left side as viewed from the rear of the bicycle.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of". For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component comprising:
    a sensor configured to detect an input to the bicycle component from an obstacle external to a bicycle;
    a controller configured to be electrically connected to the sensor, the controller being configured to obtain information related to an unusual state of the bicycle component based on an output from the sensor;
    a communicator electrically connected to the controller, the communicator being configured to send the information to a communication device, the communication device being remote from the bicycle component; and
    an actuator unit configured to be electrically connected to the controller, the actuator unit including an actuator and a housing accommodating the actuator and the sensor.

2. The bicycle component according to claim 1, wherein the sensor includes an acceleration sensor configured to detect an acceleration input to the bicycle component.

3. The bicycle component according to claim 1, further comprising:
a base member configured to be mounted to the bicycle;
a movable member configured to move with respect to the base member; and
a linkage structure connecting the base member to the movable member,
the sensor being provided to at least one of the base member, the movable member and the linkage structure.

4. The bicycle component according to claim 3, wherein the housing being provided at the base member.

5. The bicycle component according to claim 1, wherein the information indicates that the output from the sensor is larger than a threshold.

6. The bicycle component according to claim 1, wherein the unusual state includes states where a bicycle is in a normal operation and states where the bicycle is in an abnormal operation.

7. The bicycle component according to claim 1, wherein the communication device includes an external device, and
the external device has a first function other than a second function relating to a bicycle.

8. The bicycle component according to claim 1, wherein the communicator is configured to send the information to the communication device each time the controller obtains the information.

9. The bicycle component according to claim 1, wherein the bicycle component includes at least one of an operating device, a hub dynamo, a transmission device, an adjustable seatpost, a suspension, a cycle computer, and an assist drive unit.

10. The bicycle component according to claim 1, wherein the communication device includes a notification device configured to output notification information related to the unusual state.

11. A bicycle component comprising:
an actuator unit;
a controller configured to obtain information related to an unusual state of an additional bicycle component operatively connected to the bicycle component, the controller being configured to be electrically connected to the actuator unit, the controller being configured to actuate the actuator unit; and
a communicator electrically connected to the controller, the communicator being configured to send the information to a communication device, the communication device being remote from the bicycle component.

12. The bicycle component according to claim 11, wherein
the additional bicycle component is electrically connected to the bicycle component via an electrical cable.

13. The bicycle component according to claim 11, wherein
the additional bicycle component includes at least one of an operating device, a hub dynamo, a transmission device, an adjustable seatpost, a suspension, a cycle computer, and an assist drive unit.

14. The bicycle component according to claim 11, wherein
the controller is configured to obtain the information based on receipt of a signal from an additional controller of the additional bicycle component.

15. The bicycle component according to claim 11, wherein
the information is based on an additional output from an additional sensor, and the additional sensor is configured to detect an additional input to a bicycle from an obstacle.

16. The bicycle component according to claim 11, wherein
the additional sensor includes an additional acceleration sensor configured to detect an additional acceleration input to the bicycle from an obstacle, and
the information is based on an additional output from the additional acceleration sensor.

17. The bicycle component according to claim 15, wherein
the additional sensor is provided at the additional bicycle component, and
the additional sensor is configured to detect an additional input to the additional bicycle component from the obstacle.

18. The bicycle component according to claim 15, wherein
the information indicates that the additional output from the additional sensor is larger than a threshold.

19. The bicycle component according to claim 11, wherein
the controller is configured to obtain the information from the additional bicycle component.

20. A bicycle component comprising:
a sensor configured to detect an input to the bicycle component from an obstacle;
a controller configured to be electrically connected to the sensor, the controller being configured to obtain information related to an unusual state of the bicycle component based on an output from the sensor;
a communicator electrically connected to the controller, the communicator being configured to send the information to a communication device; and
a storage device configured to store the information, the information including first information obtained at a first timing and second information obtained at a second timing, the second timing being different from the first timing.

21. The bicycle component according to claim 20, wherein
the communicator is configured to send the first information and the second information together to the communication device.

22. A non-transitory computer-readable storage medium storing program thereon, the program being executable by a communication device including a notification device, the program being configured to:
cause the communication device to receive information related to an unusual state of an additional bicycle component from a communicator of a bicycle component, and
cause the notification device to output notification information related to the unusual state,
the information being obtained by a controller of the bicycle component, the controller being configured to actuate an actuator unit of the bicycle component, the additional bicycle component being configured to be operatively connected to the bicycle component, and the communication device being remote from the bicycle component and the controller.

23. A non-transitory computer-readable storage medium storing program thereon, the program being executable by a communication device including a notification device, the program being configured to:

cause the communication device to receive information related to an unusual state of a bicycle component from a communicator of the bicycle component, and cause the notification device to output notification information related to the unusual state, the information being obtained by the controller is based on an output from a sensor of the bicycle component, the sensor being configured to detect an input to the bicycle component from an obstacle external to a bicycle, and the communication device being remote from the bicycle component and the controller.

24. A bicycle component comprising:

an actuator unit;

a controller configured to obtain information related to an unusual state of an additional bicycle component connected to the bicycle component, the controller being configured to be electrically connected to the actuator unit, the controller being configured to actuate the actuator unit;

a communicator electrically connected to the controller, the communicator being configured to send the information to a communication device; and a storage device configured to store the information, the information including first information obtained at a first timing and second information obtained at a second timing, the second timing being different from the first timing.

25. A bicycle control system comprising:

the bicycle component according to claim 1; and the communication device.

* * * * *